United States Patent
Ochoa et al.

(10) Patent No.: US 10,322,531 B2
(45) Date of Patent: Jun. 18, 2019

(54) METHOD FOR PRODUCING HIGH PRESSURE LAMINATES (HPL)

(71) Applicant: LAMITECH S.A.S., Bogota (CO)

(72) Inventors: Guillermo Ochoa, Bogota (CO); Juan Manuel Gonzalez, Bogota (CO); Mauricio Arango, Bogota (CO)

(73) Assignee: LAMITECH S.A.S., Bogota (CO)

( * ) Notice: Subject to any disclaimer, the term of this patent is extended or adjusted under 35 U.S.C. 154(b) by 528 days.

(21) Appl. No.: 14/922,938

(22) Filed: Oct. 26, 2015

(65) Prior Publication Data

US 2016/0311136 A1 Oct. 27, 2016

(30) Foreign Application Priority Data

Apr. 24, 2015 (EP) ..................... 15164977

(51) Int. Cl.
*B29C 43/20* (2006.01)
*B32B 38/00* (2006.01)
*B44C 1/24* (2006.01)
*B44C 5/04* (2006.01)

(52) U.S. Cl.
CPC ............ *B29C 43/203* (2013.01); *B32B 38/00* (2013.01); *B44C 1/24* (2013.01); *B44C 5/0469* (2013.01)

(58) Field of Classification Search
CPC ........ B29C 43/203; B44C 5/0469; B44C 1/24; B32B 38/00
See application file for complete search history.

(56) References Cited

U.S. PATENT DOCUMENTS

| | | | |
|---|---|---|---|
| 2009/0151866 A1 | 6/2009 | Endert | |
| 2010/0112285 A1 | 5/2010 | Decoene | |
| 2014/0242342 A1 | 8/2014 | Vandevoorde | |
| 2016/0031135 A1* | 2/2016 | Hicks | B29C 45/0001 |
| | | | 264/279 |

FOREIGN PATENT DOCUMENTS

| | | |
|---|---|---|
| DE | 102004054764 A1 | 6/2015 |
| WO | 03006232 A1 | 1/2003 |
| WO | 2004067874 A2 | 8/2004 |

OTHER PUBLICATIONS

European Office Action and Search Report to corresponding European application No. 15164977.9, dated Nov. 2, 2015.

* cited by examiner

*Primary Examiner* — Robert J Grun
(74) *Attorney, Agent, or Firm* — Notaro, Michalos & Zaccaria P.C.

(57) ABSTRACT

A method for producing high pressure laminates (HPL) with an embossed-in-structure texture on the surface. In the method, a first structure embossed on the surface of the HPL is in perfect alignment with a second identical structure printed on the decor sheet of the HPL.

8 Claims, 3 Drawing Sheets

METHOD FOR PRODUCING HIGH PRESSURE LAMINATES (HPL)

FIELD OF THE INVENTION

The present invention relates to a method for producing high pressure laminates (HPL) with an embossed-in-structure texture on the surface, and to a high pressure laminate (HPL), obtainable by said method.

BACKGROUND TO THE INVENTION

The Invention relates to high pressure laminates (HPL). More particularly the present invention relates to a method for producing high pressure laminates with an embossed-in-texture texture on the surface, and high pressure laminates produced by said method.

High pressure laminates with an embossed-in-texture texture on the surface are high pressure laminates comprising a decorative motif and a surface texture, wherein the surface texture is mechanically embossed in registration with the decorative motif.

Wooden veneers are usually mainly produced by peeling or slicing, whereby wooden layers having a thickness of 0.2-1 mm are peeled or removed from the wood surface by slicing. These veneer layers often comprise veneer pattern equipped with an irregular wood surface due to the wood texture and the production method of the veneer.

HPL with a wooden decor are so far only produced with a general uniformly wood fiber pattern and optionally equipped with a textured surface, which is not aligned with the wood pattern. These HPL have the disadvantage that they do not possess the realistic look and texture of an original wooden surface. In particular the tactile surface of these known products does not align with the pattern on the decor sheet of the HPL.

RELEVANT PRIOR ART DOCUMENTS

WO 03/006232 A1 and WO 2004/067874 A2 describe laminated flooring planks with a board core which is laminated with a décor sheet. These planks are produced by fiber boards which have attached a decorated paper sheet.

These boards cannot be compared with high pressure laminates (HPL) which usually are produced in stacks with a staple of up to 50 HPL-units.

Thus, the object of the present invention is to provide a HPL that differs from a wooden veneer or a similar textured naturally surface neither optically nor haptically. A further object is to provide a HPL wherein the motif of the decor sheet corresponds exactly to the texture of the tactile surface embossed on the overlay layer.

SUMMARY OF THE INVENTION

The inventors found out that high pressure laminates (HPL) with an embossed-in-structure texture on the surface, wherein a first structure embossed on the surface of the HPL is in perfect alignment with a second identical structure printed on the decor sheet of the HPL, can be produced by a method wherein an arrangement of papers comprising a core layer, a decor sheet with a structure printed on the upper surface, and an overlay layer sheet, is applied on a lower press plate and then aligned to the identical structure embossed within the surface of a texturized upper press plate by moving the lower press plate in in x- and y-direction.

Thus, a first aspect of the invention provides a method for producing high pressure laminates (HPL) with an embossed-in-structure texture on the surface, wherein a first structure embossed on the surface of the HPL is in perfect alignment with a second identical structure printed on the decor sheet of the HPL, comprising the following steps:

(a) providing an arrangement of papers, comprising the following layers, (i) a core layer, comprising one or more sheets of Kraft paper impregnated with a first resin, (ii) a decor sheet applied on the upper surface of the core sheet, wherein the decor sheet comprises the second structure printed on the upper surface of the decor sheet, (iii) an overlay layer sheet applied on the surface of the decor sheet, wherein the decor sheet and the overlay layer sheet are impregnated with a second resin, (b) applying the arrangement of papers on a lower press plate of a press, (c) moving the lower press plate in in x- and y-direction to align the second structure printed on the decor sheet of the arrangement of papers to the first identical structure embossed within the texturized upper press plate, (d) moving the lower press plate in z-direction towards an upper texturized press plate, wherein the upper texturized press plate comprises the first structure embossed within the lower surface of the upper press plate, the surface which is directed towards the lower press plate, (e) pressing the upper and lower press plate against each other with a pressure of at least 50 bar at a temperature of at least 140° C. for a period of at least 20 seconds, to form the HPL (f) separating the upper and lower press plate from each other, and (g) removing the HPL layer from the lower press plate.

According to another aspect, the present invention relates to a high pressure laminate (HPL) with an embossed-in-structure texture on the surface, obtainable by the process according to the first aspect of the present invention.

Further preferred and exemplary embodiments of the invention are indicated in the dependent claims and the following detailed description, which, however, do not restrict the scope of the invention and only help to understand and explain the features of the present invention. Deviations and modifications on these particular features, particular in regard to other aspects of the invention, can be made without departing from the scope of the invention.

DETAILED DESCRIPTION

All ranges disclosed herein are to be considered to be supplemented by the term "about", unless clearly defined to the contrary or otherwise clear from the context.

All numbers or percentages relating to amounts of a substance within this application are given in wt. %, unless clearly defined to the contrary or otherwise clear from the context.

Method for Producing High Pressure Laminates (HPL)

The invention relates to a method for producing high pressure laminates (HPL). The HPL possesses an embossed-in-structure texture on the surface, wherein a first structure embossed on the surface of the HPL is in perfect alignment with a second identical structure printed on the decor sheet of the HPL. The method comprises the following steps:

(a) providing an arrangement of papers, comprising the following layers, (i) a core layer, comprising one or more sheets of Kraft paper impregnated with a first resin, (ii) a decor sheet applied on the upper surface of the core sheet, wherein the decor sheet comprises the second structure printed on the upper surface of the decor sheet, (iii) an overlay layer sheet applied on the surface of the decor sheet, wherein the decor sheet and the overlay layer sheet are impregnated with a second resin, (b) applying the arrangement of papers on a lower press plate of a press, (c) moving the lower press plate in in x- and y-direction to align the second structure printed on the decor sheet of the arrangement of papers to the first identical structure embossed within the texturized upper press plate, (d) moving the lower press plate in z-direction towards an upper texturized press plate, wherein the upper texturized press plate comprises the first structure embossed within the lower surface of the upper press plate, the surface which is directed towards the lower press plate, (e) pressing the upper and lower press plate against each other with a pressure of at least 50 bar at a temperature of at least 140° C. for a period of at least 20 seconds, to form the HPL (f) separating the upper and lower press plate from each other, and (g) removing the HPL layer from the lower press plate.

Step (a)

An arrangement of papers is provided, comprising a core layer, a decor sheet, and an overlay layer sheet.

The core layer of the inventive composite comprises one or several sheets of Kraft paper.

The Kraft paper used according to the invention is acc. to DIN 6730 a paper which mainly consists of Kraft cellulose sheet, and which has a high strength, in particularly a high tensile strength and a high consistency. Kraft paper is usually produced of at least 90% fresh, preferably unbleached sulfate chemical pulp (Kraft cellulose sheet). Beside the cellulose sheet the Kraft paper may comprise also starch, alum and/or glue for achieving e.g. defined surface effects and increases of strength. For the purposes of the present invention Kraft paper having a grammage of 150-300 $g/m^2$, particularly 220-270 $g/m^2$ proved to be particularly advantageous. A preferred Kraft is a soda Kraft paper being common to the expert in the field of HPL.

The number of used sheets of Kraft paper mainly depends upon the desired thickness of the core layer, respectively the composite. Preferably the HPL laminate according to the present invention contains 2 to 15 sheets, preferred 3 to 10 sheets and mostly preferred 4 to 8 sheets Kraft paper.

The weight of the Kraft paper used according to the Kraft paper is not further limited. It depends mainly upon the number of sheets of Kraft paper used and thus upon the desired thickness of the composite laminate. According to a preferred embodiment the weight of the used sheets of Kraft paper is in the range of 125 to 250 $g/m^2$, preferably 140-230 $g/m^2$ According to a preferred embodiment the final thickness of the inventive composite HPL is in the range of 0.5 to 2 mm, preferably 0.7 -1 mm. In that case it may be preferred that 4 sheets of Kraft paper are being used having a weight of 125 to 175 $g/m^2$, preferably 150 $g/m^2$. On the other hand also 3 sheets of Kraft paper having a weight in the range of 200 to 240 $g/m^2$, preferably in the range of 215 to 240 $g/m^2$ may be used.

The core layer is impregnated with a first resin.

A sheet of decor paper is applied to the upper side of the core layer which is formed by Kraft paper. By this layer of decor paper the inventive decorative multilayer composite achieves its appearance. Thus the decor layer refers to a layer applied to the core layer whose pattern may be visually recognized.

The decor layer refers to every material being suitable for the connection with the core layer underneath and if necessary the overlay layer above and being suited to reproduce a pattern. The preferred material for the decor paper is paper. But also foils, e.g. synthetic foils, or veneers may be covered under the tern decor papers. Veneers are wood sheets normally having a thickness of 0.1 to 3 mm and giving the decor layer a wood pattern, e.g. a defined grain.

Normally the decor is applied to the decor paper by means of a printing process. For example by means of phototechnical reproduction any pattern may be produced and printed onto the decor paper by intaglio printing process. The pattern may consist e.g. of wood, stone, ceramic, color- and/or fantasy patterns. Furthermore the pattern may be achieved also by coating the decor paper with one or several colors.

The surface weight of the used decor paper is not further limited. Preferably the surface weight is within the range of 40 to 120 $g/m^2$, more preferred in the range of 60 to 100 $g/m^2$, particularly 70 to 90 $g/m^2$.

Between the core layer and the decor layer there may be further layers if needed, such as e.g. an underlay. Said underlay layer may e.g. serve the prevention of warping of the composite laminate or the reduction of electrostatic charges. Preferably the underlay consists of one or several sheets of Kraft paper.

Preferably the structure to be printed in the surface is a structure showing an image of e.g. a wooden structure imitating a wood material.

According to the invention the decor sheet comprises a circumferential boarder rim which projects beyond the remaining layers of the arrangement of papers. Preferably the circumferential rim comprises in predetermined distances circumferential reference points, which define a reference-net. The reference points can be used to define and detect the position of the decor sheet in the x- and y-direction in the horizontal plane and therefor also the position of the arrangement of papers comprising the decor sheet within the press machine in reference to the upper press plate.

An overlay layer forms preferably the cover sheet for the HPL of the invention and is applied to the decor sheet. The overlay layer consists of one or several sheets of paper which preferably contains alpha cellulose fibers.

The surface weight of the sheets used for the overlay layer is not further restricted. It lies preferably within the range of 12 to 40 $g/m^2$, preferably within the range of 20 to 35 $g/m^2$ and more preferred within the range of 25 to 32 $g/m^2$.

The overlay layer preferably has a high resistance against chemical, thermic and mechanical use. In case fibrous material is used for the overlay layer then this fibrous material preferably contains bleached cellulose fiber, in particular cellulose, e.g. alpha cellulose. The overlay layer material preferably has a consistency which guarantees that the pattern of the decor paper layer is visible after the pressing to the inventive decorative multilayered composite material. Thus the overlay layer preferably shows a high degree of transparency.

The decor sheet and the overlay layer sheet are impregnated with a second resin as a binding material.

The binding material arrangement according to the invention contains at least one, preferably however at least two different binding materials in cured condition. By this at least one cured binding material the individual Kraft paper sheets are connected among each other and the core layer formed from the Kraft paper sheets with the decor sheet. The decor sheet is hereby applied to the core layer formed from the Kraft paper sheets.

According to a preferred embodiment the binding agent which connects in cured condition the Kraft paper sheets among each other and the core layer formed from the Kraft paper sheets with the decor sheet forms a heat cured resin as the first resin. Preferred binding agents are liquid or liquefied resins which taken for themselves or with reaction agents, e.g. hardening agents or accelerators cure without cleavage volatile components through polymerization or polyaddition to duroplasts via a cross linking reaction. Phenol resins prove to be particularly preferred for this purpose. Resinenol resins are particularly preferred and defined as condensation products of phenols with aldehydes according to DIN 16916, part I and ISO 10082. These resins are used as binding agents for Kraft paper sheets.

The binding agents bind the decor layer with the core layer in the hardened condition and is preferably also a thermally curing resin. For the purpose of the present invention aminoplasts are preferably used. Aminoplasts are polycondensation products of carbonyl compounds, preferably aldehydes as formaldehyde or ketones and NA-groups containing compounds as urea, melamine, urethane, cyan, resp. cyandiamide, aromatic amines and sulfonamides, which are connected together in a Mannich-reaction and cured to duroplasts in use.

Among these binding agents there are curable condensation products of melamine and formaldehyde and melamine-urea-formaldehyde-resins which are preferred.

According to a further embodiment the laminate of the present invention comprises an overlay layer which is provided on the decor layer. The binding agent layer is provided between the decor layer and the overlay layer and binds the overlay de with the decor layer in the cured condition.

According to a further embodiment for the production of a laminate of the present invention, which comprises an overlay layer the overlay layer sheet is impregnated with a melamine-formaldehyde resin. The corresponding construction of an overlay layer and a decor sheet is placed on the upper Kraft paper sheet which is usually impregnated with a phenol-aldehyde resin.

Step (b)

For the pressing process press plates can be used which consist preferably of steel, particularly stainless steel with a Vickers hardness of at least 350.

The arrangement of papers is applied on a lower press plate of a press used for producing the HPL layer. The lower press plate is heatable, preferably the lower press plate is heated to a temperature in the range from 140 to 220° C., particularly 150-200° C., mostly preferred about 180° C. In a preferred embodiment the temperature of the lower press plate is held during the whole pressing procedure at the desired temperature, at least during process steps (b)-(g) (always hot press plate).

Preferably the lower press plate comprises holes on the upper surface which are connected with channels formed within the lower press plate through which a gaseous fluid can be passed. As gaseous liquid in principle any gas can be used, preferably air is used. By applying air through the cannels an airflow is generated and the fluid flows out of the lower press plate through the holes on the upper surface. Using this airflow it is possible to remove any object which is applied on the upper surface of the press plate, e.g. an arrangement of papers or a HPL layer, which usually sticks to the press plate after fusing the paper layers together in the hot press operation. Preferably the gaseous liquid flows out of the holes on the upper surface of the lower press plate with a pressure of commonly 0.5-2 bar. This process of using air supports the separation of the cured HPL-arrangement from the press plates.

Preferably the transfer of the paper sheets after hot curing together is supported using fixing and releasing means, which fix the edges of the paper arrangement. Preferably a clamping system is used and at least one clamp is fixed at the arrangement of the paper, and which holds the arrangement in a predetermined position during the press operation. After finishing the press operation and during the separation of the press plates from one another the clamping system supports the separation of the cured HPL which optionally stuck on one of the press plates. Furthermore the fixing means area also used to separate the HPL-arrangement from the press plates in the hot condition.

Step (c)

After applying the arrangement of papers on the lower press plate the lower press plate is moved in x- and y-direction to align the arrangement of papers comprising the decor sheet with a structure printed on the decor sheet with the identical structure embossed within the lower surface of the texturized upper press plate, so that the structure printed on the upper surface of the decor sheet of the arrangement of papers is in perfect alignment with the identical structure embossed within the lower surface of the texturized upper press plate.

The lower press plate is moved in x- and y-direction by using control means for controlling the predetermined alignment of the décor sheet with the upper press plate. This control means moves the lower plate particularly by means of motors in the x-y direction by a signal of an optical measuring device as discussed below.

For supporting the alignment process the decor sheet has a circumferential rim which projects beyond the remaining layers of the arrangement of Kraft- and overlay papers. Said rim comprises in predetermined distances circumferential marking points (reference points), which can be used to encode a predetermined position of the decor layer, and thus of the arrangement of papers, relative to the lower press plate. The position of the decor sheet can be identified by an optical measuring device as an optical sensor which detects the position of the marking points both in x and y direction. The signal of the detected position of the marking points is sent to the control means, which compares this signal with a target position (reference image) which is encoded with the upper texturized press plate in a predetermined manner. Preferably the target position is encoded with the upper texturized press plate in such a manner that structure embossed within the upper press plate and the identical structure printed on the decor sheet can be aligned to each other after comparing the signal of the optical sensor with the predetermined pattern to form a perfect match. Based on the comparison results the control means adjusts the lower press plate in x- and y-direction to align the position of the decor paper on the lower press plate with the identical structure embossed within the texturized upper press plate, to produce high pressure laminates with a perfect embossed-in-structure texture on their surface.

Preferably a camera is used as the optical sensor.

Step (d)

Following step (c) the lower press plate is moved in z-direction towards an upper texturized press plate of the press system. The upper texturized press plate comprises a structure embossed within the lower surface of the upper press plate.

The lower surface of the upper press plate is the surface which is directed towards the lower press plate.

In an alternative embodiment the upper press plate is moved in z-direction towards the lower press plate. In a further embodiment the upper press plate and the lower press plate are simultaneously moved in z-direction against each other.

Step (e)

Following step (d) the upper and lower press plate are pressed against each other with a pressure of preferably at least 50 bar. More preferably the pressure is in the range of 60 to 100 bar. Preferably the temperature of the press plates is at least 140° C., more preferably in the range of 150-200° C. Preferably the upper and lower press plate are pressed against each other for a period of at least 20 seconds, more preferably for a period of at least 35 seconds depending on the number of paper sheets.

By pressing the upper and lower press plate against each other the HPL is formed. For the purposes of the invention, especially the complex alignment process only one HPL-sheet is formed within a very short time interval (30-40 seconds), said HPL must be separated from the press arrangement in the hot condition after the curing operation This is in contrast to the usual HPL-production with a plurality of HPL-sheets which are cured within at least 1 h by a complex heating and cooling process, after which the HPL can be separated without special protection means against heat.

Step (f)

Following step (e) the upper and lower press plate are separated from each other.

Step (g)

After separating the upper and lower press plate from each other, the formed HPL as a single produced unit is removed from the lower press plate by using fixing and releasing means. Preferably a clamping system is used and at least one clamp is fixed at the HPL, then the HPL is removed by pulling out the HPL using the clamping system.

Preferably the detachment of the HPL layer from the lower press plate is supported by an airflow which is produced by applying a gaseous fluid through channels of the lower press plate. Said fluid flows out through the holes on the upper surface of the lower press plate.

The final HPL product is obtained by cutting the rim parts of the décor sheet from the rest of the HPL.

Figure 1:
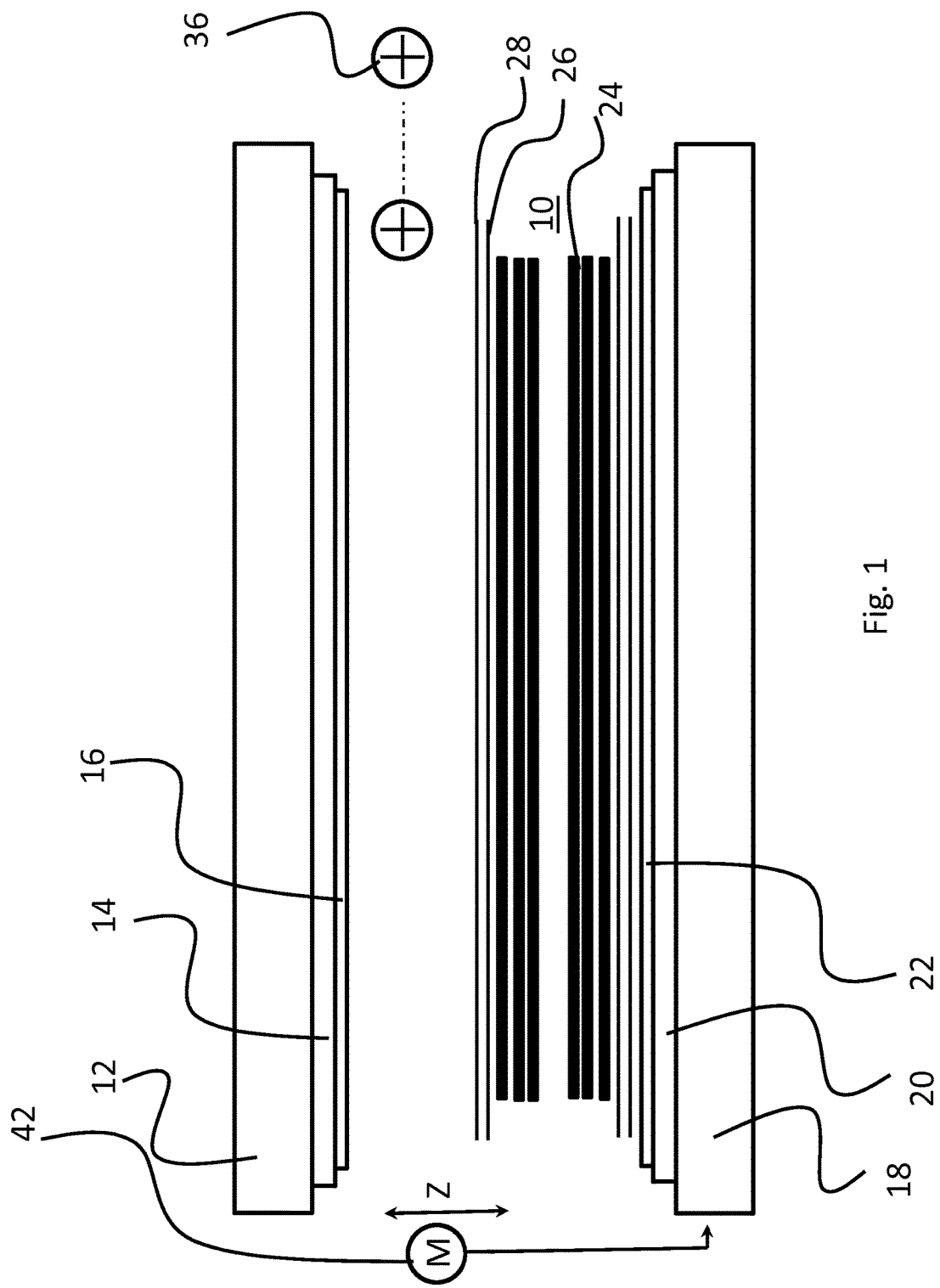
FIG. 1 is a sectional view of a press device in the open condition.
Figure 2:
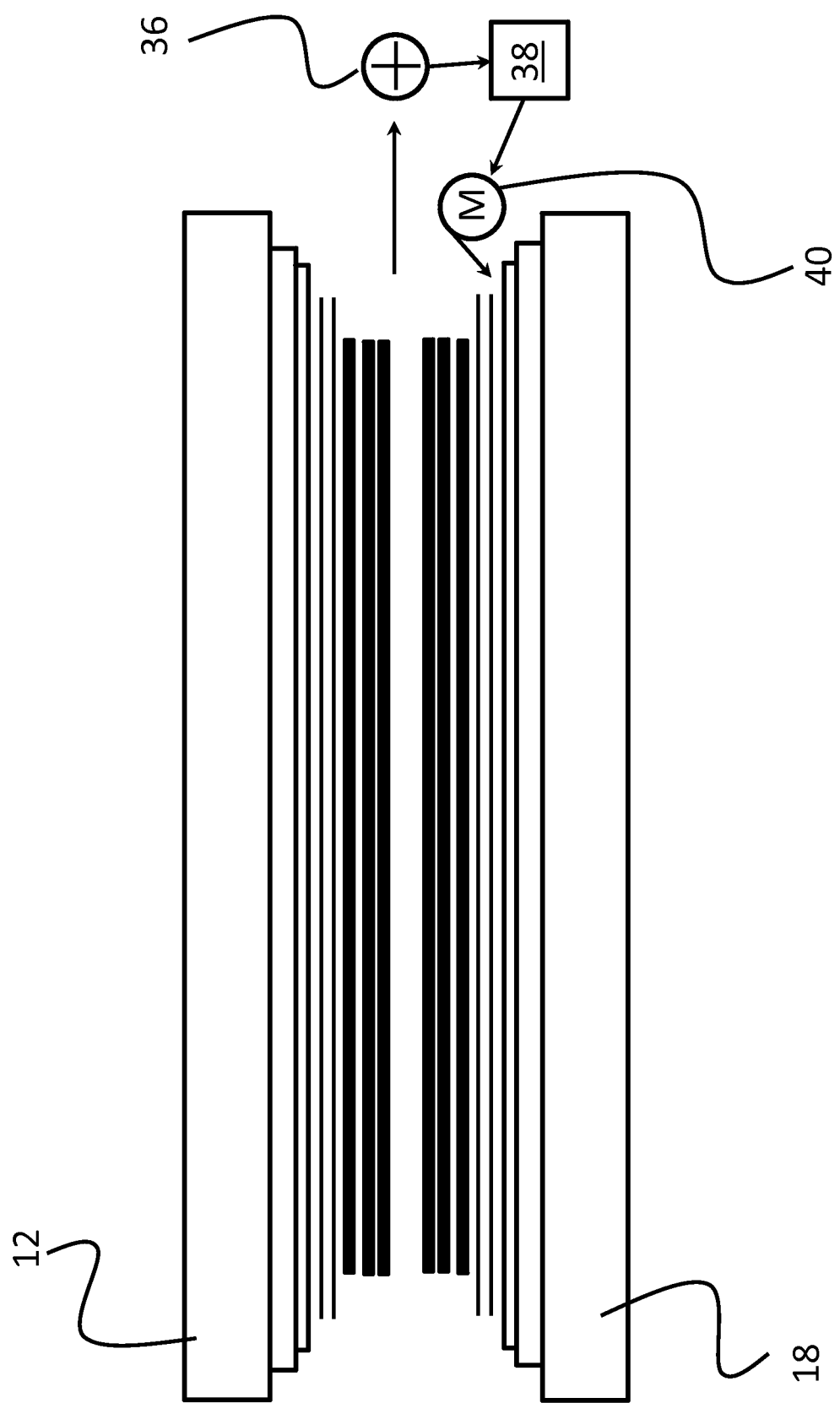
FIG. 2 is a sectional view of said press device in the closed condition.

The press device 10 comprises an upper press arrangement 12 with a heating system providing a predetermined temperature. The lower side of the press device 10 comprising a press holding means, which holds the upper press plate 16. Opposite thereto a lower press device 18 is arranged which comprises a lower press arrangement 18 together with a second press holding means 20 and a lower press plate 22 thereon. Press holding means 20 and lower press plate 22 are movable with relation to the upper press arrangement 12 in x-y direction. X and y direction are arranged in the horizontal plane. Furthermore both press arrangements 12 and 18 can be moved together in z-direction (vertical direction) also shown in FIG. 1.

In the open condition several layer of Kraft paper sheets 24 are arranged over the lower press plate 22. A décor paper sheet 26 is arranged on the Kraft paper layers 24 and an overlay paper sheet 28 is then arranged on the décor paper sheet 26.

Figure 3:
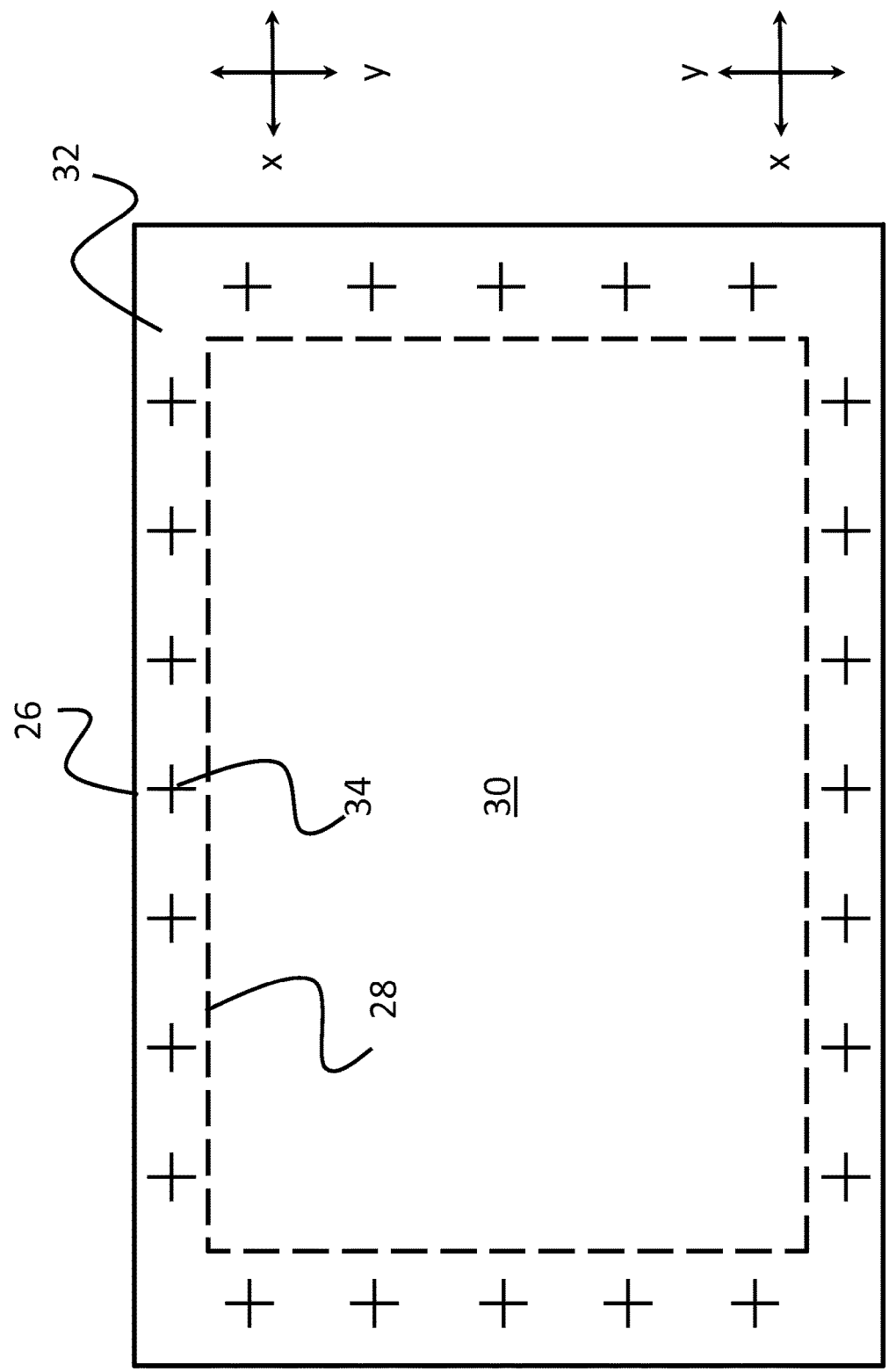
FIG. 3 is a plan view on the décor sheet together with the overlay sheet.

As shown in FIG. 3, the décor paper sheet 26 comprises an internal area 30 which is surrounded by an external rim 32. It is also shown in broken lines that the overlay paper 28 has those dimension that it reached only until the rim 32. Therefore the rim 32 is free of any overlay paper sheet 28 and can therefore be optically detected by marking points which are situated on the rim 32. As marking points reference points 34 are situated in predetermined distances on the rim 32 and provide a reference picture which can be used for an alignment-process with the pattern which is pressed into the upper press plate 16. Therefore these reference points 34 are in relation with the fixed upper press plate 16.

In order to align the décor paper 26 with the pattern of the press plate 16 an optical device 36 is provided which optically detects the reference points 34 and sends their coordinates of the x-/y positions of said reference points 34 to a control unit 38. Said control unit compares the coordinates of the décor paper sheet 26 with the fixed coordinated of the upper press plate 16 and controls each the x and y-movement of the lower press plate 22 by a first moving means 40 particularly by a motor which moves the lower press plate 22 for the alignment with the upper press plate 16 comprising the pattern which is fixed in the upper press plate 16.

After the alignment in the horizontal plane is finished the control unit starts a second moving means 42 which moves the lower press plate 22 against the upper press plate 16. The movement is finished when the final pressure is reached. At the same time the control unit controls the pressing interval after finishing the pressing operation.

In a further embodiment the press device 10 comprises a clamping and releasing means which supports the release of the hot laminate after the press operation is finished and the press device 10 is in the open condition. Said clamping and releasing device 44 lifts the laminate from one of the press plates and transfers the laminate by a clamping operation from the area of the press device 10.

High Pressure Laminates (HPL)

The inventors found out that by carrying out the above described method for producing high pressure laminate (HPL) it is possible to obtain high pressure laminates with an embossed-in-structure texture on the surface, wherein a first structure embossed on the surface of the HPL is in perfect alignment with a second identical structure printed on the decor sheet of the HPL. This result can only be reached by producing the HPL in an optically controlled alignment process of one HPL-sheet, however in a very short time.

Thus, the HPL does neither optically nor haptically differ from a wooden veneer or a similarly textured natural surface which is imitated by the HPL decor.

An essential feature of the present invention is that only one laminate can be produced at a time because it is not possible to align several paper stacks on top of each other, each of them being in registration with the structure embossed in the upper press plate. For economic reasons, since it is not reasonable to heat up and cool the press for each press cycle producing only one laminate, the production will be done using an "always hot" press plate.

EXAMPLES

The present invention will now be described with reference to examples thereof, without limiting the scope of the invention to these particular examples.

Example

The example relates to a method for producing high pressure laminate (HPL) according to the present invention.

Seven layers of Kraft paper impregnated with phenol formaldehyde resin, one sheet of décor paper and one sheet of overlay paper both impregnated with melamine formaldehyde resin are placed in a HPL-pressure device comprising an alignment control unit for the upper press plate and the paper stack. For this purpose the décor paper is oversized with relation to the other paper sheets generating a rim which is outside of the other sheets. This rim comprises reference points which are used for the alignment with the upper pressure plate of the press machine. The press operation lasts for about 40 sec. at a temperature of about 180° C. and a pressure of about 80 bars.

After that press operation the resins are cured and the final product has a thickness of about 0.8 mm.

The final product is taken out immediately after this press operation by means of a clamp device and with the aid of a air pressure device which supports the separation of the HPL from the press plate.

The invention claimed is:

1. A method for producing high pressure laminates (HPL) with an embossed-in-structure texture on the surface, wherein a first structure embossed on the surface of the HPL is in perfect alignment with a second identical structure printed on the decor sheet of the HPL, comprising the following steps:
   (a) providing an arrangement of papers, comprising the following layers,
      (i) a core layer, comprising one or more sheets of Kraft paper impregnated with a first resin,
      (ii) a decor sheet applied on the upper surface of the core sheet, wherein the decor sheet comprises the second structure printed on the upper surface of the decor sheet,
      (iii) an overlay layer sheet applied on the surface of the decor sheet, wherein the decor sheet and the overlay layer sheet are impregnated with a second resin,
   (b) applying the arrangement of papers on a lower press plate of a press,
   (c) moving the lower press plate in in x- and y- direction to align the second structure printed on the decor sheet of the arrangement of papers to the first identical structure embossed within the texturized upper press plate, wherein the lower press plate is moved by using control means for controlling the predetermined alignment of the decor sheet with the upper press plate,
   (d) moving the lower press plate in z- direction towards an upper texturized press plate, wherein the upper texturized press plate comprises the first structure embossed within the lower surface of the upper press plate, the surface which is directed towards the lower press plate,
   (e) pressing the upper and lower press plate against each other with a pressure of at least 50 bar at a temperature of at least 140° C. for a period of at least 20 seconds, to form the HPL
   (f) separating the upper and lower press plate from each other, and
   (g) removing the HPL layer from the lower press plate, wherein the decor sheet comprises a circumferential rim which projects beyond the remaining layers of the arrangement of papers, the circumferential rim comprises in predetermined distances circumferential marking points, which encode a predetermined position of the decor layer relative to the lower press plate, the position of the decor sheet is identified by an optical measuring device by detecting the position of the marking points in x-y direction, the detected position of the marking points is compared with a target position (reference image), which is encoded with the upper texturized press plate in a predetermined manner and based on the corresponding measurement results the lower press plate is adjusted in x-y direction to align the position of the decor paper on the lower press plate with the structure embossed within the texturized upper press plate, to produce high pressure laminates with an embossed-in-structure texture on their surface.

2. The method for producing high pressure laminates (HPL) according to claim 1, wherein the arrangement of papers is applied on the lower press plate and the HPL layer is removed from the lower press plate by fixing and releasing means.

3. The method for producing high pressure laminates (HPL) according to claim 2, wherein a clamping system is used as fixing and releasing means.

4. The method for producing high pressure laminates (HPL) according to claim 1, wherein the HPL layer is removed from the lower press plate by an airflow applied through openings within the lower press plate.

5. The method for producing high pressure laminates (HPL) according to claim 1, wherein the press plates have a temperature of at least 140° C., preferably 150-200° C. during the whole pressing procedure comprising at least steps (b) to (g).

6. The method for producing high pressure laminates (HPL) according to claim 1, wherein a camera is used as the optical measuring device.

7. The method for producing high pressure laminates (HPL) according to claim 1, wherein the upper and lower press plate are pressed against each other with a pressure in the range of 60 to 100 bar at a temperature in the range of 150 to 200° C. for a period in the range of 35 to 60 seconds.

8. High pressure laminate (HPL) with an embossed-in-structure texture on the surface, obtainable by the process according to claim 1.

* * * * *